(12) United States Patent
Horii

(10) Patent No.: US 12,137,192 B2
(45) Date of Patent: Nov. 5, 2024

(54) PRINTING SYSTEM, METHOD FOR CONTROLLING PRINTING SYSTEM, AND INFORMATION PROCESSING APPARATUS

(71) Applicant: SEIKO EPSON CORPORATION, Tokyo (JP)

(72) Inventor: Tetsuya Horii, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/470,266

(22) Filed: Sep. 19, 2023

(65) Prior Publication Data

US 2024/0098202 A1 Mar. 21, 2024

(30) Foreign Application Priority Data

Sep. 20, 2022 (JP) .................................. 2022-149120

(51) Int. Cl.
*H04N 1/32* (2006.01)

(52) U.S. Cl.
CPC . *H04N 1/32106* (2013.01); *H04N 2201/3215* (2013.01)

(58) Field of Classification Search
CPC .... G06F 3/1222; G06F 3/1238; G06F 3/1274; G06F 3/122; G06F 3/1267; G06F 3/1288; H04N 1/32106; H04N 2201/3215; Y02D 10/00
USPC ...................................................... 358/1.15
See application file for complete search history.

(56) References Cited

U.S. PATENT DOCUMENTS

| | | | | |
|---|---|---|---|---|
| 5,493,408 A | * | 2/1996 | Kurogane | G03G 15/502 358/401 |
| 2005/0270566 A1 | * | 12/2005 | Tanaka | H04N 1/00413 358/1.15 |
| 2009/0097064 A1 | * | 4/2009 | Tominaga | H04N 1/32 358/1.15 |
| 2010/0149582 A1 | * | 6/2010 | Silverbrook | H04M 1/724092 358/1.14 |
| 2011/0026079 A1 | * | 2/2011 | Nakagawa | G06F 3/1204 358/1.15 |
| 2015/0242161 A1 | * | 8/2015 | Kitagata | G06F 3/1228 358/1.14 |

(Continued)

FOREIGN PATENT DOCUMENTS

JP 2004-333525 A 11/2004

*Primary Examiner* — Negussie Worku
(74) *Attorney, Agent, or Firm* — WORKMAN NYDEGGER

(57) ABSTRACT

A server apparatus includes an acceptance section that accepts from a personal computer a print completion date and time that is the date and time when printing of a teaching material content is completed, a determination section that determines a print start date and time that is the date and time to start printing the teaching material content based on the print completion date and time and a print turnaround period that is the period required to print the teaching material content, and a print instruction section that transmits to the printer a print start instruction that instructs start of the printing of the teaching material content at the print start date and time, and the printer includes a print execution section that starts printing the teaching material content at the print start date and time when the printer receives the print start instruction from the server apparatus.

8 Claims, 5 Drawing Sheets

(56) References Cited

U.S. PATENT DOCUMENTS

| | | | |
|---|---|---|---|
| 2016/0028913 A1* | 1/2016 | Yoshida | H04N 1/00244 |
| | | | 358/1.15 |
| 2017/0085735 A1* | 3/2017 | Yoshida | H04N 1/32523 |
| 2018/0239563 A1* | 8/2018 | Okuda | H04N 1/00244 |
| 2019/0107985 A1* | 4/2019 | Tomihisa | G06F 3/1267 |
| 2022/0026079 A1* | 1/2022 | Staranchuk | C23F 13/16 |
| 2023/0182481 A1* | 6/2023 | Shioiri | G06F 3/1239 |
| | | | 347/43 |
| 2023/0379415 A1* | 11/2023 | Sawada | B41J 29/393 |
| 2024/0098192 A1* | 3/2024 | Horii | G09B 7/02 |

\* cited by examiner

PRINTING SYSTEM, METHOD FOR CONTROLLING PRINTING SYSTEM, AND INFORMATION PROCESSING APPARATUS

The present application is based on, and claims priority from JP Application Serial Number 2022-149120, filed Sep. 20, 2022, the disclosure of which is hereby incorporated by reference herein in its entirety.

BACKGROUND

1. Technical Field

The present disclosure relates to a printing system, a method for controlling the printing system, and an information processing apparatus.

2. Related Art

JP-A-2004-333525 discloses a system that prints teaching material contents.
JP-A-2004-333525 is an example of the related art.
The system described in JP-A-2004-333525, however, has a possibility of not being able to print teaching material contents at the date and time desired by the user.

SUMMARY

A printing system according to an aspect of the present disclosure that solves the problem described above is a printing system including a first terminal apparatus, a printing apparatus, and an information processing apparatus communicably connected to each of the first terminal apparatus and the printing apparatus. The information processing apparatus includes an acceptance section that accepts a print completion date and time that is a date and time when printing of a content is completed from the first terminal apparatus, a determination section that determines a print start date and time that is a date and time to start printing the content based on the print completion date and time and a print turnaround period that is a period required to print the content, and a print instruction section that transmits a print start instruction that instructs start of the printing of the content at the print start date and time to the printing apparatus. The printing apparatus includes a print execution section that starts printing the content at the print start date and time when the printing apparatus receives the print start instruction from the information processing apparatus.

A method for controlling a printing system according to another aspect of the present disclosure that solves the problem described above is a method for controlling a printing system including a first terminal apparatus, a printing apparatus, and an information processing apparatus communicably connected to each of the first terminal apparatus and the printing apparatus. The information processing apparatus executes an acceptance step of accepting a print completion date and time that is a date and time when printing of a content is completed from the first terminal apparatus, a determination step of determining a print start date and time that is a date and time to start printing the content based on the print completion date and time and a print turnaround period that is a period required to print the content, and a print instruction step of transmitting a print start instruction that instructs start of the printing of the content at the print start date and time to the printing apparatus. The printing apparatus executes a print execution step of starting the printing of the content at the print start date and time when the printing apparatus receives the print start instruction from the information processing apparatus.

An information processing apparatus according to still another aspect of the present disclosure that solves the problem described above is an information processing apparatus communicably connected to each of a first terminal apparatus and a printing apparatus, the information processing apparatus including an acceptance section that accepts a print completion date and time that is a date and time when printing of a content is completed from the first terminal apparatus, a determination section that determines a print start date and time that is a date and time to start printing the content based on the print completion date and time and a print turnaround period that is a period required to print the content, and a print instruction section that transmits a print start instruction that instructs start of the printing of the content at the print start date and time to the printing apparatus.

DESCRIPTION OF EMBODIMENTS

An embodiment of the present disclosure will be described below with reference to the drawings.

Figure 1:
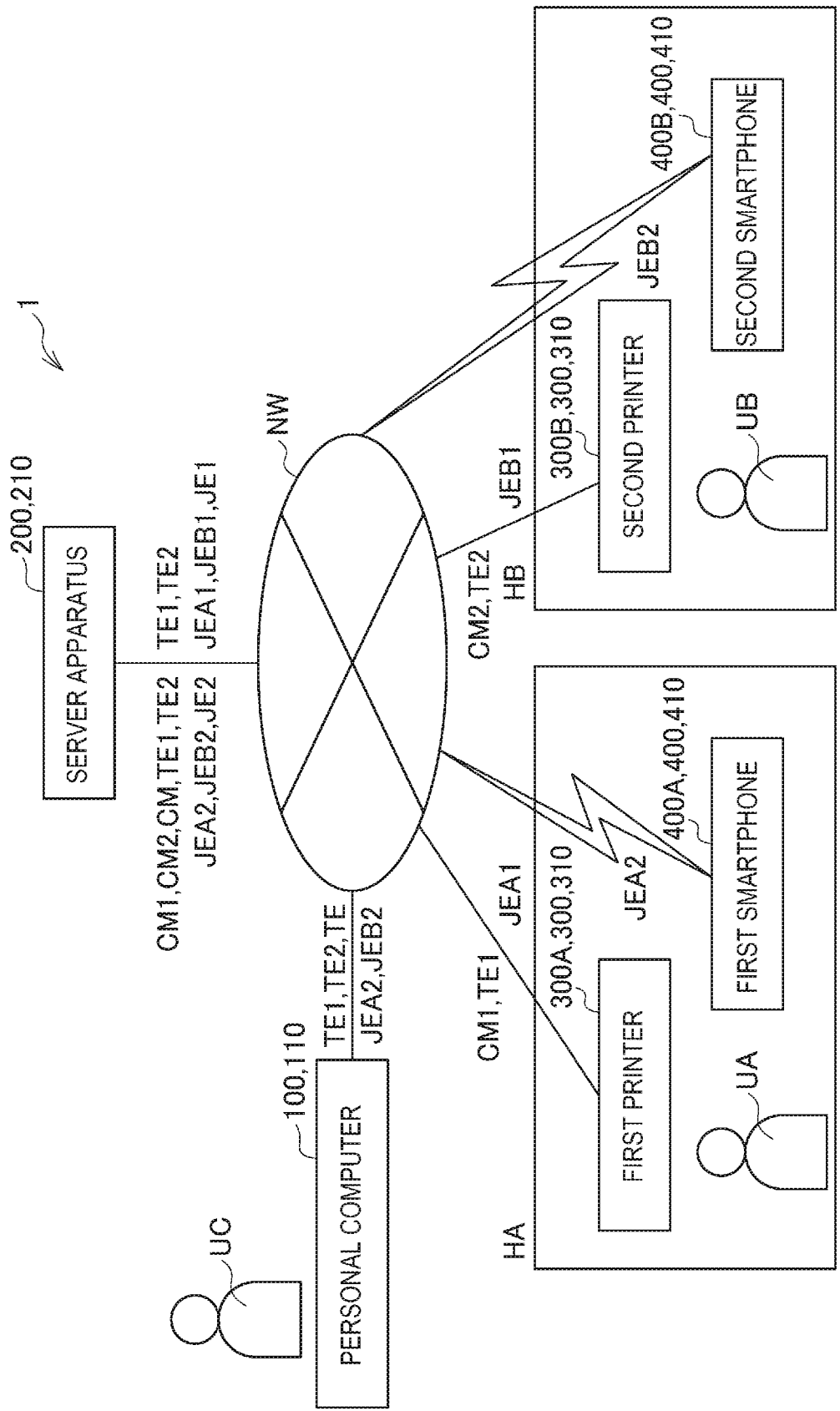
FIG. 1 shows an example of the configuration of a printing system according to an embodiment of the present disclosure.

The configuration of a printing system 1 according to the present embodiment will first be described with reference to FIG. 1. FIG. 1 shows an example of the configuration of the printing system 1 according to the present embodiment. The printing system 1 includes a personal computer 100, a server apparatus 200, a printer 300, and a smartphone 400, as shown in FIG. 1.

The server apparatus 200 is communicably connected to each of the personal computer 100, the printer 300, and the smartphone 400 via a network NW. The network NW is, for example, the Internet.

The present embodiment will be described with reference to, but not limited to, the case where the network NW is the Internet. The network NW may, for example, be a local area network (LAN) or a wide area network (WAN).

The printer 300 includes a first printer 300A and a second printer 300B. The smartphone 400 includes a first smartphone 400A and a second smartphone 400B. The first printer 300A is disposed in a room HA, where a first user UA is present, and the second printer 300B is disposed in a room HB, where a second user UB is present, as shown in FIG. 1. The first smartphone 400A is used by the first user UA, and the second smartphone 400B is used by the second user UB. The first user UA and the second user UB are each, for example, a student.

The first user UA and the second user UB each correspond to an example of a "user who uses printed matter".

The first printer 300A and the second printer 300B each correspond to an example of a "printing apparatus". The first printer 300A and the second printer 300B also correspond to an example of a "plurality of printing apparatuses".

The personal computer 100 transmits a print completion date and time TE, which is the date and time when printing of a teaching material content CT is completed, to the server apparatus 200.

The personal computer 100 transmits a first print completion date and time TE1 to the server apparatus 200, for example, in response to operation from a third user UC. The first print completion date and time TE1 is the date and time when the first printer 300A completes the printing of the teaching material content CT. In other words, the first print completion date and time TE1 is the date and time specified by the third user UC as the date and time when the first printer 300A completes the printing of the teaching material content CT.

The personal computer 100 further transmits a second print completion date and time TE2 to the server apparatus 200, for example, in response to operation from the third user UC. The second print completion date and time TE2 is the date and time when the second printer 300B completes the printing of the teaching material content CT. In other words, the second print completion date and time TE2 is the date and time specified by the third user UC as the date and time when the second printer 300B completes the printing of the teaching material content CT.

The third user UC is the user who provides the first user UA and the second user UB with the teaching material content CT. In other words, the third user UC is the user who instructs the first printer 300A and the second printer 300B to print the teaching material content CT. The third user UC is, for example, a teacher.

The third user UC corresponds to an example of a "user who instructs printing of a content".

The teaching material content CT corresponds to an example of a "content".

The first print completion date and time TE1 and the second print completion date and time TE2 each correspond to an example of a "print completion date and time". In the present embodiment, the "date and time" indicates, for example, the year, month, date, and time. The "time" indicates hours, minutes, and seconds.

The present embodiment will be described with reference to, but not limited to, the case where the "content" is the teaching material content CT. The "content" may, for example, be a document to be printed by the printer 300. For example, the "content" may be a communication memo to the first user UA and the second user UB. For example, the "content" may be a questionnaire to the first user UA and the second user UB.

The personal computer 100 includes a first control section 110. The first control section 110 includes a first processor, such as a CPU (central processing unit), and a first memory, such as a ROM (read only memory) and a RAM (random access memory), to control each portion of the personal computer 100. The first memory stores a first control program. The first memory may include a magnetic storage apparatus, such as an HDD (hard disk drive), or a semiconductor storage apparatus, such as an SSD (solid state drive).

In the first control section 110, the first processor reads the first control program stored in the first memory and performs processing. In other words, the first control section 110 performs processing through the cooperation between hardware and software.

The first processor may be formed of a single processor, or a plurality of processors may function as the first processor.

In the present embodiment, the first processor executes the first control program to control each portion of the personal computer 100, but not necessarily. The first control section 110 may include an ASIC (application specific integrated circuit), for example, and the ASIC may perform processing through the functions implemented therein. The first control section 110 may, for example, include a signal processing circuit, and the signal processing circuit may perform signal processing to perform the processing.

The personal computer 100 corresponds to an example of a "first terminal apparatus".

When the server apparatus 200 receives the print completion date and time TE from the personal computer 100, the server apparatus 200 determines a print start date and time TS, which is the date and time to start printing the teaching material content CT. The server apparatus 200 transmits to the printer 300 a print start instruction CM, which instructs the printer 300 to start printing the teaching material content CT at the print start date and time TS, and the print completion date and time TE.

For example, when the server apparatus 200 receives the first print completion date and time TE1 from the personal computer 100, the server apparatus 200 determines a first print start date and time TS1, which is the date and time when the first printer 300A starts printing the teaching material content CT. The server apparatus 200 transmits a first print start instruction CM1 and the first print completion date and time TE1 to the first printer 300A. The first print start instruction CM1 instructs the first printer 300A to start printing the teaching material content CT at the first print start date and time TS1.

For example, when the server apparatus 200 receives the second print completion date and time TE2 from the personal computer 100, the server apparatus 200 determines a second print start date and time TS2, which is the date and time when the second printer 300B starts printing the teaching material content CT. The server apparatus 200 transmits a second print start instruction CM2 and the second print completion date and time TE2 to the first printer 300A. The second print start instruction CM2 instructs the first printer 300A to start printing the teaching material content CT at the second print start date and time TS2.

The first print start date and time TS1 and the second print start date and time TS2 each correspond to an example of a "print start date and time".

The first print start instruction CM1 and the second print start instruction CM2 each correspond to an example of a "print start instruction".

The first print start date and time TS1, the second print start date and time TS2, the first print start instruction CM1, and the second print start instruction CM2 will be further described with reference to FIG. 2.

The configuration of the server apparatus 200 will be further described with reference to FIG. 2.

The server apparatus 200 corresponds to an example of an "information processing apparatus".

The printer 300 starts printing the teaching material content CT at the print start date and time TS when the printer 300 receives the print start instruction CM from the server apparatus 200. When the printer 300 completes the printing of the teaching material content by the print completion date and time TE, the printer 300 transmits to the server apparatus 200 print completion information JE1 indicating that the printing of the teaching material content CT has been completed. When the server apparatus 200 receives the print completion information JE1 from the printer 300, the server apparatus 200 transmits to the personal computer 100 and the smartphone 400 print completion information JE2 indicating that the printing of the teaching material content CT has been completed by the print completion date and time TE.

The first printer 300A starts printing the teaching material content CT at the first print start date and time TS1, for example, when the first printer 300A receives the first print start instruction CM1 from the server apparatus 200. When the first printer 300A completes the printing of the teaching material content by the first print completion date and time TE1, the first printer 300A transmits first print completion information JEA1 to the server apparatus 200. The first print completion information JEA1 indicates that the printing of the teaching material content CT has been completed by the first print completion date and time TE1. The first print completion information JEA1 corresponds to an example of the print completion information JE1. The server apparatus 200 transmits first print completion information JEA2 to the personal computer 100 and the first smartphone 400A when the server apparatus 200 receives the first print completion information JEA1 from the first printer 300A. The first print completion information JEA2 indicates that the printing of the teaching material content CT has been completed by the first print completion date and time TE1. The first print completion information JEA2 corresponds to an example of the print completion information JE2. The second printer 300B starts printing the teaching material content CT at the second print start date and time TS2, for example, when the second printer 300B receives the second print start instruction CM2 from the server apparatus 200. When the second printer 300B completes the printing of the teaching material content by the second print completion date and time TE2, the second printer 300B transmits second print completion information JEB1 to the server apparatus 200. The second print completion information JEB1 indicates that the printing of the teaching material content CT has been completed by the second print completion date and time TE2. The second print completion information JEB1 corresponds to an example of the print completion information JE1. The server apparatus 200 transmits second print completion information JEB2 to the personal computer 100 and the second smartphone 400B when the server apparatus 200 receives the second print completion information JEB1 from the second printer 300B. The second print completion information JEB2 indicates that the printing of the teaching material content CT has been completed by the second print completion date and time TE2. The second print completion information JEB2 corresponds to an example of the print completion information JE2.

The print completion information JE1, the print completion information JE2, the first print completion information JEA1, the first print completion information JEA2, the second print completion information JEB1, and the second print completion information JEB2 each correspond to an example of "print completion information".

The configuration of the first printer 300A will be further described with reference to FIG. 3.

The first smartphone 400A and the second smartphone 400B are each communicably connected to the network NW, for example, via wireless communication, such as Wi-Fi (registered trademark). The first smartphone 400A receives the first print completion information JEA2 from the server apparatus 200. The second smartphone 400B receives the second print completion information JEB2 from the server apparatus 200.

When the first smartphone 400A receives the first print completion information JEA2 from the server apparatus 200, the first smartphone 400A notifies the first user UA that the first printer 300A has completed the printing of the teaching material content CT by the first print completion date and time TE1. For example, when the first smartphone 400A receives the first print completion information JEA2 from the server apparatus 200, the first smartphone 400A displays an image indicating that the first printer 300A has completed the printing of the teaching material content CT by the first print completion date and time TE1 on an LCD (liquid crystal display) of the first smartphone 400A.

When the second smartphone 400B receives the second print completion information JEB2 from the server apparatus 200, the second smartphone 400B notifies the second user UB that the second printer 300B has completed the printing of the teaching material content CT by the second print completion date and time TE2. For example, when the second smartphone 400B receives the second print completion information JEB2 from the server apparatus 200, the second smartphone 400B displays an image indicating that the second printer 300B has completed the printing of the teaching material content CT by the second print completion date and time TE2 on the LCD of the second smartphone 400B.

The first smartphone 400A and the second smartphone 400B each correspond to an example of a "second terminal apparatus".

The present embodiment will be described with reference to, but not limited to, the case where when the first smartphone 400A receives the first print completion information JEA2, an image indicating that the first printer 300A has completed the printing of the teaching material content CT by the first print completion date and time TE1 is displayed on the LCD of the first smartphone 400A. For example, the first smartphone 400A may receive an e-mail message, as the first print completion information JEA2, indicating that the first printer 300A has completed the printing of the teaching material content CT by the first print completion date and time TE1.

In the present embodiment, when the second smartphone 400B receives the second print completion information JEB2, the second smartphone 400B displays an image indicating that the second printer 300B has completed the printing of the teaching material content CT by the second print completion date and time TE2 on the LCD of the second smartphone 400B, but not necessarily. For example, the second smartphone 400B may receive an e-mail message, as the second print completion information JEB2, indicating that the second printer 300B has completed the printing of the teaching material content CT by the second print completion date and time TE2.

The personal computer 100 receives the first print completion information JEA2 and the second print completion information JEB2 from the server apparatus 200.

When the personal computer 100 receives the first print completion information JEA2 from the server apparatus 200, the personal computer 100 notifies the third user UC that the first printer 300A has completed the printing of the teaching material content CT by the first print completion date and time TE1. For example, when the personal computer 100 receives the first print completion information JEA2 from the server apparatus 200, the personal computer 100 displays an image indicating that the first printer 300A has completed the printing of the teaching material content CT by the first print completion date and time TE1 on an LCD of the personal computer 100.

When the personal computer 100 receives the second print completion information JEB2 from the server apparatus 200, the personal computer 100 notifies the third user UC that the second printer 300B has completed the printing of the teaching material content CT by the second print completion date and time TE2. For example, when the personal computer 100 receives the second print completion information JEB2 from the server apparatus 200, the personal computer 100 displays an image indicating that the second printer 300B has completed the printing of the teaching material content CT by the second print completion date and time TE2 on the LCD of the personal computer 100.

The present embodiment will be described with reference to, but not limited to, the case where when the personal computer 100 receives the first print completion information JEA2, the personal computer 100 displays an image indicating that the first printer 300A has completed the printing of the teaching material content CT on the LCD of the personal computer 100. For example, the personal computer 100 may receive an e-mail message, as the first print completion information JEA2, indicating that the first printer 300A has completed the printing of the teaching material content CT.

In the present embodiment, when the personal computer 100 receives the second print completion information JEB2, the personal computer 100 displays an image indicating that the second printer 300B has completed the printing of the teaching material content CT on the LCD of the personal computer 100, but not necessarily. For example, the personal computer 100 may receive an e-mail message, as the second print completion information JEB2, indicating that the second printer 300B has completed the printing of the teaching material content CT.

The configuration of the server apparatus 200 will next be described with reference to FIG. 2. FIG. 2 shows an example of the configuration of the server apparatus 200 according to the present embodiment. The server apparatus 200 includes a second control section 210, a second operation mechanism 220, a second display mechanism 230, and a second communication interface 240, as shown in FIG. 2. The second control section 210 includes a second processor 210A and a second memory 210B. The second control section 210 controls the action of each of the portions of the server apparatus 200.

The second operation mechanism 220, the second display mechanism 230, and the second communication interface 240 are coupled to the second control section 210.

The second operation mechanism 220 includes a variety of keys, buttons, and other components, and accepts operation from a user. The user is, for example, an administrator of the server apparatus 200. The second operation mechanism 220 then generates an operation signal corresponding to the accepted operation and outputs the generated operation signal to the second control section 210.

The second display mechanism 230 includes an LCD or any other component and displays a variety of images on the LCD in accordance with instructions from the second control section 210.

The second communication interface 240 includes a connector and an interface circuit and is coupled to the second control section 210. In the present embodiment, the second communication interface 240 is an interface for communication with the personal computer 100, the printer 300, and the smartphone 400 in compliance, for example, with the Ethernet (registered trademark) standard.

The second processor 210A is formed, for example, of a CPU, a DSP (digital signal processor), or a microcomputer. The second processor 210A may be formed of a plurality of processors or a single processor.

The second processor 210A may be hardware programmed to achieve the functions of the portions that will be described later. That is, the second processor 210A may be configured to incorporate a second control program PG2 as a hardware circuit. In this case, the second processor 210A is formed, for example, of an ASIC, an FPGA (field-programmable gate array), or any other component.

The following description will be made with reference to a case where the second processor 210A executes the second control program PG2 to achieve a variety of functions of the second control section 210.

The second memory 210B has a storage region where programs executed by the second processor 210A and data processed by the second processor 210A are stored. The second memory 210B stores the second control program PG2 executed by the second processor 210A, a variety of image data relating to the actions of the server apparatus 200, setting data, and other pieces of information.

The second memory 210B has a nonvolatile storage region where the programs and the data are stored in a nonvolatile manner. The second memory 210B may include, for example, a ROM, an HDD, or an SSD as the nonvolatile storage region. The second memory 210B may further has a volatile storage region to constitute a work area where the programs to be executed by the second processor 210A and the data to be processed by the second processor 210A are temporarily stored. The second memory 210B may include, for example, a RAM as the volatile storage region.

Figure 2:
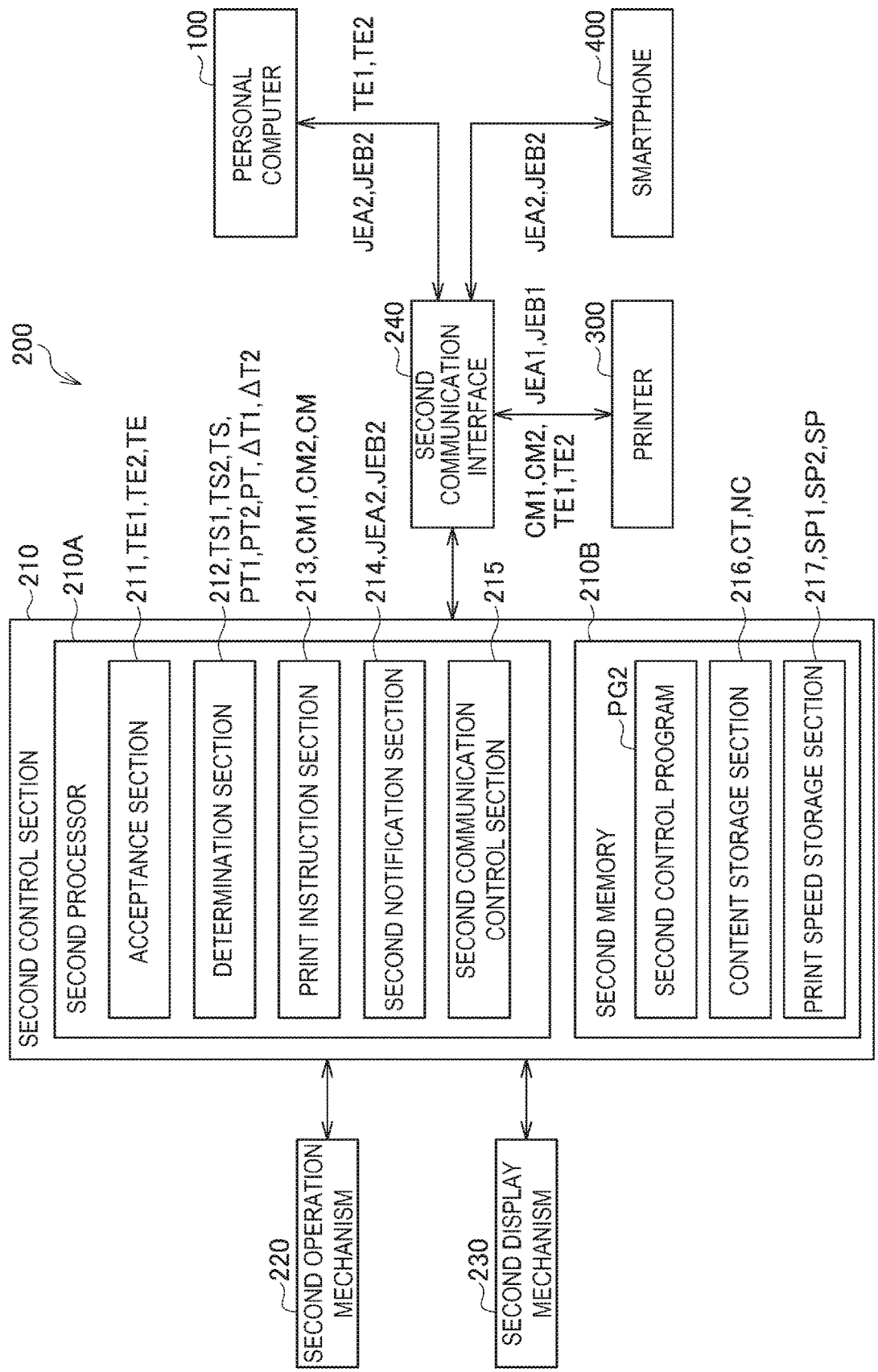
FIG. 2 shows an example of the configuration of a server apparatus according to the embodiment.

The second control section 210 includes an acceptance section 211, a determination section 212, a print instruction section 213, a second notification section 214, a second communication control section 215, a content storage section 216, and a print speed storage section 217, as shown in FIG. 2. The portions described above are each achieved, for example, by the second control program PG2 executed by the second processor 210A through cooperation between software and hardware.

The content storage section 216 stores the teaching material content CT in advance. The teaching material content CT is, for example, questions or assignments in English, mathematics, and other subjects. The teaching material content CT is stored in the content storage section 216, for example, in accordance with an instruction from the personal computer 100.

The content storage section 216 further stores in advance the number of printed sheets NC in the printing of the teaching material content CT on the printer 300.

The present embodiment will be described with reference to a case where the first printer 300A and the second printer 300B each print the teaching material content CT on a printing sheet having a predetermined size. The predetermined size is, for example, the A4 size specified by ISO (International Organization for Standardization) 216. That is, printing the teaching material content CT on each of the first printer 300A and the second printer 300B causes the teaching material content CT to be printed on A4-size print sheets, the number of which corresponds to the number of printed sheets NC.

The present embodiment will be described with reference to, but not limited to, the case where the first printer 300A and the second printer 300B each print the teaching material content CT on an A4-size print sheet specified by ISO 216. The first printer 300A and the second printer 300B may each print the teaching material content CT on a print sheet having a predetermined size. The predetermined size may, for example, be the B5 size specified by ISO 216 or the A3 size specified by ISO 216.

The print speed storage section 217 stores a print speed SP of the printer 300 in advance. The print speed SP includes, for example, a first print speed SP1 and a second print speed SP2. The first print speed SP1 is the print speed SP of the first printer 300A. The second print speed SP2 is the print speed SP of the second printer 300B.

In the present embodiment, the first print speed SP1 indicates, for example, how many sheets of A4-size print sheets can be printed by the first printer 300A in one minute. The second print speed SP2 indicates, for example, how many sheets of A4-size print sheets can be printed by the second printer 300B in one minute.

The acceptance section 211 accepts the print completion date and time TE, which is the date and time when the printing of the teaching material content CT is completed, from the personal computer 100.

In the present embodiment, the acceptance section 211 accepts the first print completion date and time TE1, which is the date and time when the first printer 300A completes the printing of the teaching material content CT, from the personal computer 100. The first print completion date and time TE1 corresponds to an example of the print completion date and time TE. The acceptance section 211 further accepts the second print completion date and time TE2, which is the date and time when the second printer 300B completes the printing of the teaching material content CT, from the personal computer 100. The second print completion date and time TE2 corresponds to an example of the print completion date and time TE. The second print completion date and time TE2 may be the same as or different from the first print completion date and time TE1.

The determination section 212 determines the print start date and time TS, which is the date and time to start printing the teaching material content CT, based on the print completion date and time TE and a print turnaround period PT, which is the period required to print the teaching material content CT.

In the present embodiment, the determination section 212 determines the first print start date and time TS1 based on the first print completion date and time TE1 and a first print turnaround period PT1. The first print turnaround period PT1 is the period required for the first printer 300A to print the teaching material content CT. The first print turnaround period PT1 corresponds to an example of the print turnaround period PT. The first print start date and time TS1 is the date and time when the first printer 300A starts printing the teaching material content CT. The first print start date and time TS1 corresponds to an example of the print start date and time TS.

The determination section 212 determines the first print start date and time TS1 based, for example, on Expression (1) below.

$$TS1 = TE1 - PT1 - \Delta T1 \quad (1)$$

In Expression (1), the first margin period AT1 is the period required for the first printer 300A to reliably complete the printing of the teaching material content CT by the first print completion date and time TE1. The first margin period AT1 is, for example, 30 minutes. In other words, when the first printer 300A starts printing the teaching material content CT at the first print start date and time TS1 and completes the printing of the teaching material content CT in the first print turnaround period PT1, the printing of the teaching material content CT is completed earlier than the first print completion date and time TE1 by the first margin period AT1.

The determination section 212 calculates the first print turnaround period PT1 based on the number of printed sheets NC in the printing of the teaching material content and the first print speed SP1 of the first printer 300A. The determination section 212 calculates the first print turnaround period PT1 based, for example, on Expression (2) below.

$$PT1 = NC/SP1 \quad (2)$$

The determination section 212 further determines the second print start date and time TS2 based on the second print completion date and time TE2 and the second print turnaround period PT2. The second printing turnaround period PT2 is the period required for the second printer 300B to print the teaching material content CT. The second print turnaround period PT2 corresponds to an example of the print turnaround period PT. The second printing start date and time TS2 is the date and time when the second printer 300B starts printing the teaching material content CT. The second print start date and time TS2 corresponds to an example of the print start date and time TS.

The determination section 212 determines the second print start date and time TS2 based, for example, on Expression (3) below.

$$TS2 = TE2 - PT2 - \Delta T2 \quad (3)$$

In Expression (3), the second margin period AT2 is the period required for the second printer 300B to reliably complete the printing of the teaching material content CT by the second print completion date and time TE2. The second margin period AT2 is, for example, 30 minutes. In other words, when the second printer 300B starts printing the teaching material content CT at the second print start date and time TS2 and completes the printing of the teaching material content CT in the second print turnaround period PT2, the printing of the teaching material content CT is completed earlier than the second print completion date and time TE2 by the second margin period AT2.

The determination section 212 calculates the second print turnaround period PT2 based on the number of printed sheets NC in the printing of the teaching material content and the second print speed SP2 of the second printer 300B. The determination section 212 calculates the second print turnaround period PT2 based, for example, on Expression (4) below.

$$PT2 = NC/SP2 \quad (4)$$

The print instruction section 213 transmits to the printer 300 the print start instruction CM, which instructs the printer 300 to start printing the teaching material content CT at the print start date and time TS. The print instruction section 213 also transmits the print completion date and time TE to the printer 300.

In the present embodiment, the print instruction section 213 transmits to the first printer 300A the first print start instruction CM1, which instructs the first printer 300A to start printing the teaching material content CT at the first print start date and time TS1. The first print start instruction CM1 corresponds to an example of the print start instruction CM. The print instruction section 213 also transmits the first print completion date and time TE1 to the first printer 300A.

The print instruction section 213 further transmits to the second printer 30B the second print start instruction CM2, which instructs the second printer 300B to start printing the teaching material content CT at the second print start date and time TS2. The second print start instruction CM2 corresponds to an example of the print start instruction CM. The print instruction section 213 also transmits the second print completion date and time TE2 to the second printer 300B.

The second notification section 214 transmits the print completion information JE2 to the personal computer 100 and the smartphone 400 when the second notification section 214 receives the print completion information JE1 from the printer 300. The print completion information JE1 and JE2 each indicate that the printer 300 has completed the printing of the teaching material content CT by the print completion date and time TE. That is, the print completion information JE1 and JE2 each correspond to an example of the "print completion information".

In the present embodiment, when the second notification section 214 receives the first print completion information JEA1 from the first printer 300A, the second notification section 214 transmits the first print completion information JEA2 to the personal computer 100 and the first smartphone 400A. The first print completion information JEA1 and JEA2 each indicate that the first printer 300A has completed the printing of the teaching material content CT by the first print completion date and time TE1.

The second notification section 214 further transmits the second print completion information JEB2 to the personal computer 100 and the second smartphone 400B when the second notification section 214 receives the second print completion information JEB1 from the second printer 300B. The second print completion information JEB1 and JEB2 each indicate that the second printer 300B has completed the printing of the teaching material content CT by the second print completion date and time TE2.

The second notification section 214 corresponds to an example of a "second completion notification section".

The second communication control section 215 receives the first print completion date and time TE1 from the personal computer 100. The second communication control section 215 further receives the second print completion date and time TE2 from the personal computer 100.

The second communication control section 215 also transmits the first print start instruction CM1 and the first print completion date and time TE1 to the first printer 300A. The second communication control section 215 further transmits the second print start instruction CM2 and the second print completion date and time TE2 to the second printer 300B.

The second communication control section 215 receives the first print completion information JEA1 from the first printer 300A. The second communication control section 215 further receives the second print completion information JEB1 from the second printer 300B.

The second communication control section 215 transmits the first print completion information JEA2 to the personal computer 100 and the first smartphone 400A. The second communication control section 215 further transmits the second print completion information JEB2 to the personal computer 100 and the second smartphone 400B.

The printer 300 according to the present embodiment will next be described with reference to FIG. 3. FIG. 3 shows an example of the configuration of the printer 300 according to the present embodiment. The printer 300 is an apparatus that prints letters, images, and other objects on a print medium M such as a print sheet. In FIG. 3, the first printer 300A will first be described. The configuration of the second printer 300B is substantially the same as that of the first printer 300A, and the description below will therefore be primarily made of the differences from the first printer 300A.

Figure 3:
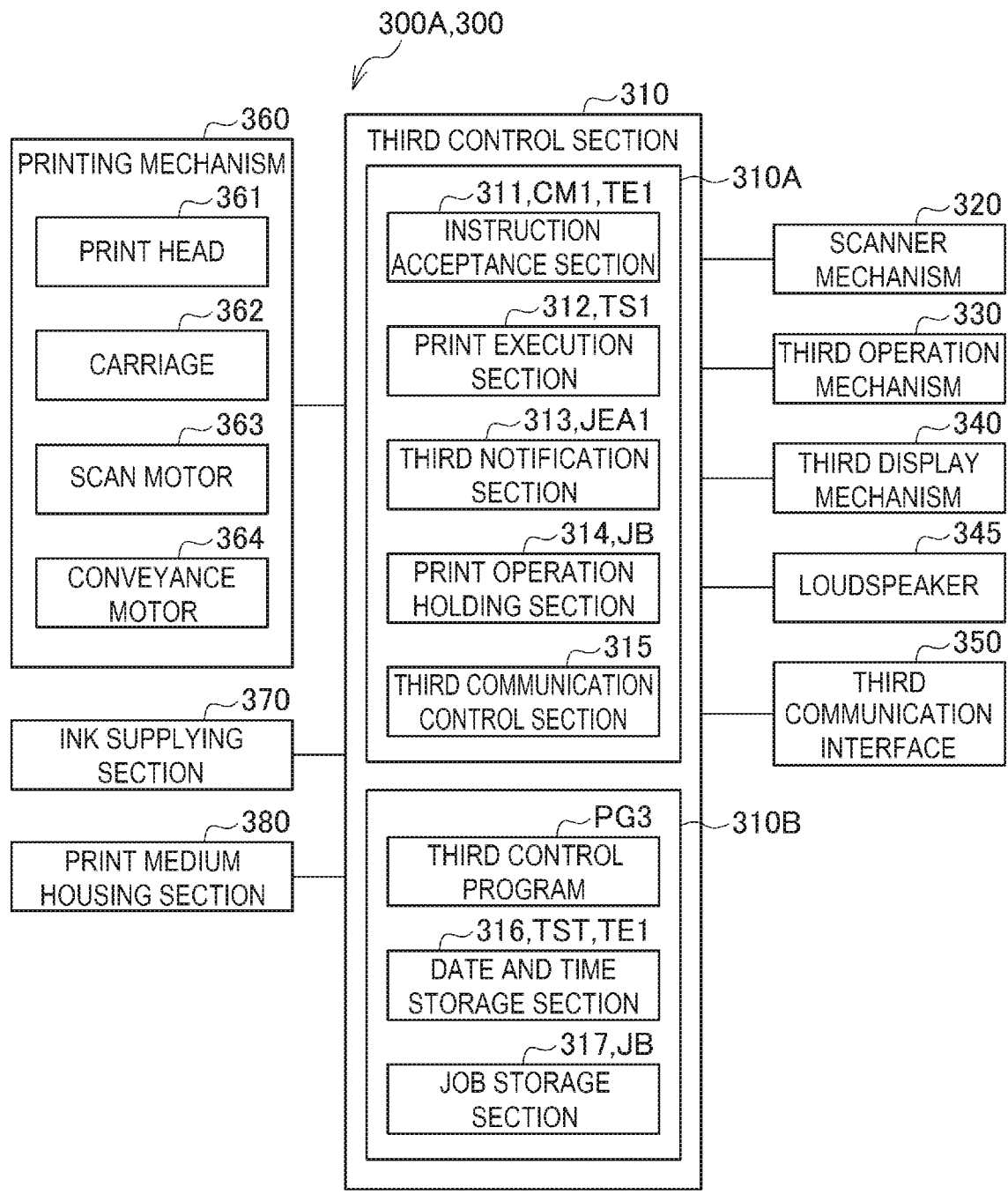
FIG. 3 shows an example of the configuration of a printer according to the embodiment.

The first printer 300A includes a third control section 310, a scanner mechanism 320, a third operation mechanism 330, a third display mechanism 340, a loudspeaker 345, a third communication interface 350, a printing mechanism 360, an ink supplying section 370, and a print medium housing section 380, as shown in FIG. 3.

The third control section 310 includes a third processor 310A, such as a CPU, and a third memory 310B, such as a ROM and a RAM, to control the portions of the printer 300. The third memory 310B stores a third control program PG3. The third memory 310B may include a magnetic storage apparatus, such as an HDD, or a semiconductor storage apparatus, such as an SSD.

In the third control section 310, the third processor 310A reads the third control program PG3 stored in the third memory 310B and performs processing. In other words, the third control section 310 performs processing through cooperation between hardware and software. The third processor 310A may be formed of a single processor, or a plurality of processors may function as the third processor 310A.

In the present embodiment, the third processor 310A executes the third control program PG3 to control each of the portions of the printer 300, but not necessarily. The third control section 310 may include, for example, an ASIC, and the ASIC may perform the processing through functions implemented therein. The third control section 310 may, for example, include a signal processing circuit, and the signal processing circuit may perform signal processing to perform the processing.

The scanner mechanism 320 includes an image sensor, such as a CCD (charge coupled device), a CMOS (complementary metal oxide semiconductor) device, a CIS (contact image sensor), or any other image sensor, reads an image printed on a print medium M, such as a print sheet, and generates image data.

The third operation mechanism 330 includes an input device, such as operation switches and a touch panel, provided as part of the first printer 300A, detects operation performed by the first user UA on the input device, and outputs a detection signal corresponding to the operation to the third control section 310. The third control section 310 performs processing corresponding to the operation of the first user UA based on the input from the third operation mechanism 330.

The third display mechanism 340 includes a plurality of LEDs (light emitting diodes), a display panel, and other components, and turns on and off and blinks the LEDs in predetermined aspects, displays information on the display panel, and performs other types of processing under the control of the third control section 310.

The loudspeaker 345 outputs voice under the control of the third control section 310.

The printing mechanism 360 prints letters, images, and other objects on the print medium M, such as a print sheet, with ink under the control of the third control section 310. The printing mechanism 360 includes a print head 361, a carriage 362, a scan motor 363, and a conveyance motor 364 as a printing-related configuration.

The print head 361 is an inkjet print head and discharges ink supplied from an ink supplying section 370 toward the print medium M. The carriage 362 carries the print head 361 and scans the print medium M in a primary scan direction X. The primary scan direction X is a direction that intersects with a secondary scan direction Y. The secondary scan direction Y represents the direction in which the print medium M is conveyed. The scan motor 363 causes the carriage 362 to scan the print medium M in the primary scan direction X. The conveyance motor 364 conveys the print medium M in the conveyance direction.

The printing mechanism 360 will be further described with reference to FIG. 4.

The ink supplying section 370 houses ink tanks that each store ink and supplies the print head 361 of the printing mechanism 360 with the ink from the ink tanks. The ink supplied by the ink supplying section 370 includes, for example, cyan (C), magenta (M), yellow (Y), and black (K) inks.

The print medium housing section 380 is configured to house the print media M. When the print media M are each a cut sheet, the print medium housing section 380 delivers each of the housed cut sheets into a conveyance path that is not shown through the conveyance performed by the conveyance motor 364. The print medium housing section 380 may be configured to collect printed matter that is printed print media M. The configuration that collects printed matter may be a configuration that stacks and places the cut sheets.

Functional blocks provided by the third control section 310 of the first printer 300A will next be described.

The third control section 310 includes, as the functional blocks, an instruction acceptance section 311, a print execution section 312, a third notification section 313, a print operation holding section 314, a third communication control section 315, a date and time storage section 316, and a job storage section 317.

The third processor 310A executes the third control program PG3 to function as the instruction acceptance section 311, the print execution section 312, the third notification section 313, the print operation holding section 314, and the third communication control section 315. Furthermore, when the third processor 310A executes the third control program PG3, the third control section 310 causes the third memory 310B to function as the date and time storage section 316 and the job storage section 317.

The third control section 310 also has a timekeeping function of measuring the date and time. The third control section 310 adjusts the date and time of the timekeeping function, for example, by communicating with the server apparatus 200 on a regular basis.

The date and time storage section 316 stores the first print completion date and time TE1 and the first print start date and time TS1. The first print completion date and time TE1 and the first print start date and time TS1 are accepted from the server apparatus 200 by the instruction acceptance section 311 and stored in the date and time storage section 316 by the instruction acceptance section 311.

The job storage section 317 stores a print job JB having been put on hold by the print operation holding section 314. The print job is stored in the job storage section 317 by the print operation holding section 314. The print job JB stored in the job storage section 317 is executed by the print execution section 312 after the printing of the teaching material content CT is completed. The instruction acceptance section 311 accepts the first print start instruction CM1 from the server apparatus 200. The first print start instruction CM1 instructs the first printer 300A to start printing the teaching material content CT at the first print start date and time TS1. The instruction acceptance section 311 further accepts the first print completion date and time TE1 from the server apparatus 200. The first print completion date and time TE1 is the date and time when the first printer 300A completes the printing of the teaching material content CT.

When the instruction acceptance section 311 accepts the first print start instruction CM1, the instruction acceptance section 311 causes the date and time storage section 316 to store the first print start date and time TS1. When the instruction acceptance section 311 accepts the first print completion date and time TE1, the instruction acceptance section 311 causes the date and time storage section 316 to store the first print completion date and time TE1.

When the instruction acceptance section 311 receives the first print start instruction CM1 from the server apparatus 200, the print execution section 312 starts printing the teaching material content CT at the first print start date and time TS1. The print execution section 312 starts printing the teaching material content CT via the printing mechanism 360, for example, when the date and time measured by the timekeeping function reaches the first print start date and time TS1.

When the printing of the teaching material content CT is completed by the first print completion date and time TE1, the third notification section 313 transmits the first print completion information JEA1 to the server apparatus 200. The first print completion information JEA1 indicates that the first printer 300A has completed the printing of the teaching material content CT by the first print completion date and time TE1.

When the printing of the teaching material content CT is completed, the third notification section 313 notifies the first user UA of the completion of the printing of the teaching material content CT. For example, when the printing of the teaching material content CT is completed, the third notification section 313 causes the loudspeaker 345 to output voice indicating the completion of the printing of the teaching material content CT. Instead, for example, when the printing of the teaching material content CT is completed, the third notification section 313 may display an image indicating the completion of the printing of the teaching material content CT on the display panel of the third display mechanism 340.

The third notification section 313 corresponds to an example of a "first completion notification section".

When the print operation holding section 314 accepts an instruction of printing another content different from the teaching material content CT during the period from the first print start date and time TS1 to the first print completion date and time TE1, the print operation holding section 314 holds the execution of the printing of the other content. The print operation holding section 314 causes the job storage section 317 to store the print job JB corresponding to the instruction of printing the other content different from the teaching material content CT.

In the present embodiment, when the print operation holding section 314 accepts an instruction of printing another content different from the teaching material content CT during the period from the first print start date and time TS1 to the first print completion date and time TE1, the print operation holding section 314 puts the execution of the printing of the other content on hold, but not necessarily. For example, when the print operation holding section 314 accepts an instruction of printing another content different from the teaching material content CT during the period from the first print start date and time TS1 to the completion of the printing of the teaching material content CT, the print operation holding section 314 may put the printing of the other content on hold.

The third communication control section 315 receives the first print start instruction CM1 and the first print completion date and time TE1 from the server apparatus 200. The third communication control section 315 transmits the first print completion information JEA1 to the server apparatus 200.

The differences between the third control section 310 of the second printer 300B and the third control section 310 of the first printer 300A will next be primarily described.

The date and time storage section 316 stores the second print completion date and time TE2 and the second print start date and time TS2.

The instruction acceptance section 311 accepts the second print start instruction CM2 from the server apparatus 200. The second print start instruction CM2 instructs the second printer 300B to start printing the teaching material content CT at the second print start date and time TS2.

When the instruction acceptance section 311 receives the second print start instruction CM2 from the server apparatus 200, the print execution section 312 causes the second printer 300B to start printing the teaching material content CT at the second print start date and time TS2.

When the second printer 300B completes the printing of the teaching material content CT by the second print completion date and time TE2, the third notification section 313 transmits the second print completion information JEB1 to the server apparatus 200. When the second printer 300B completes the printing of the teaching material content CT, the third notification section 313 notifies the second user UB of the completion of the printing of the teaching material content CT.

When the print operation holding section 314 accepts an instruction of printing another content different from the teaching material content CT during the period from the second print start date and time TS2 to the second print completion date and time TE2, the print operation holding section 314 puts the execution of the printing of the other content different from the teaching material content CT on hold.

The third communication control section 315 receives the second print start instruction CM2 and the second print completion date and time TE2 from the server apparatus 200. The third communication control section 315 transmits the second print completion information JEB1 to the server apparatus 200.

The configuration of the printing mechanism 360 will next be described with reference to FIG. 4. FIG. 4 is a perspective view showing an example of the configuration of the printing mechanism 360.

Figure 4:
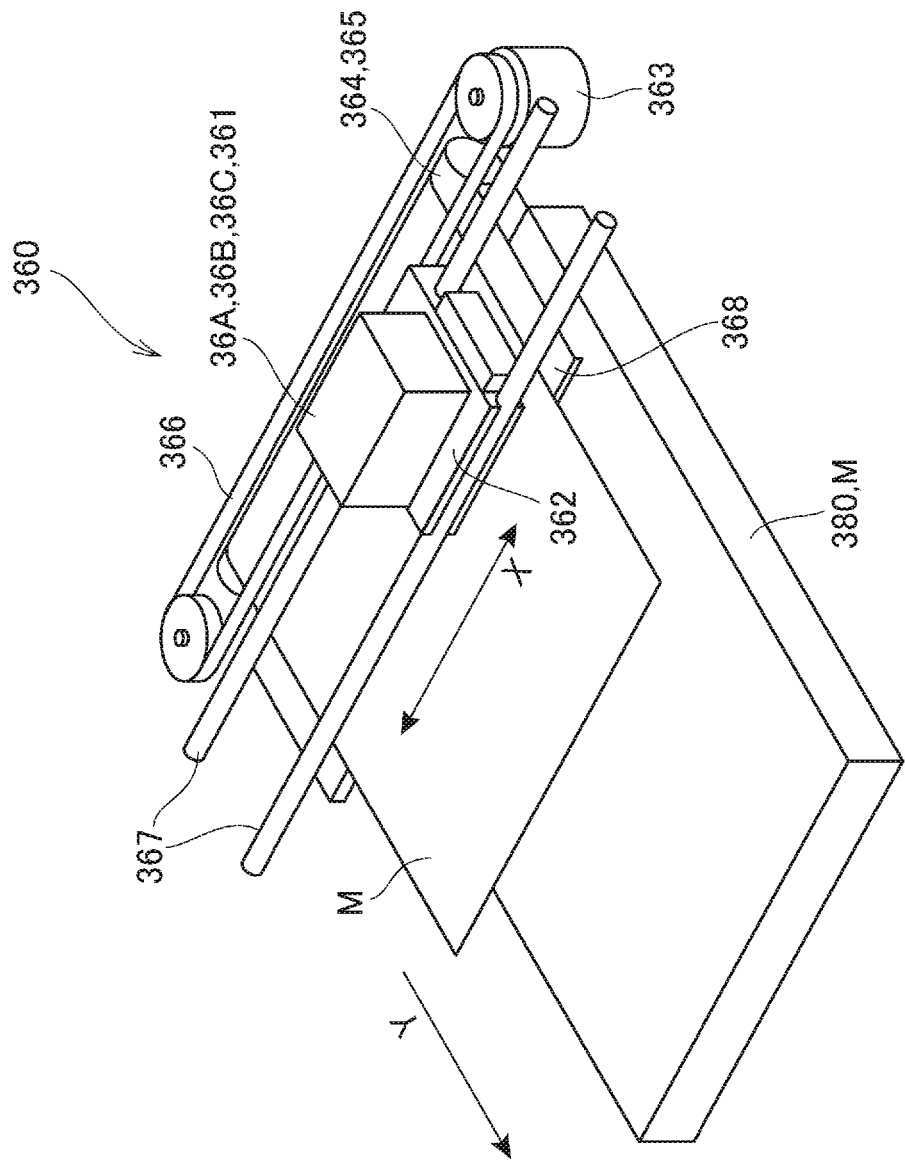
FIG. 4 is a perspective view showing an example of the configuration of a printing mechanism.

The printing mechanism 360 includes the carriage 362, the scan motor 363, a sheet feed roller 365, a pulling belt 366, guide rails 367, a platen 368, and the print medium housing section 380, as shown in FIG. 4.

The sheet feed roller 365 is driven by the conveyance motor 364. The pulling belt 366 is driven by the scan motor 363. The guide rails 367 support the carriage 362 movably in the primary scan direction X. The carriage 362 is supported by the guide rails 367 and driven in the primary scan direction X by the scan motor 363 via the pulling belt 366.

The carriage 362 carries a head unit 36A.

The head unit 36A includes a plurality of (four, for example) ink cartridges 36B and the print head 361. The ink cartridges 36B are accommodated in the ink supplying section 370.

The plurality of ink cartridges 36B can be attached to and detached from the carriage 362. The plurality of ink cartridges 36B contain different color inks. The ink cartridges 36B contain, for example, cyan (C), magenta (M), yellow (Y), and black (K) inks. The inks contained in the ink cartridges 36B are supplied to the print head 361.

The print head 361 has, for example, nozzles 36C. The nozzles 36C are arranged at a plurality of positions along the secondary scan direction Y at the surface of the print head 361 that faces the platen 368. The print head 361 discharges the inks via the nozzles 36C onto the print medium M.

The print medium M is taken out of the print medium housing section 380, wrapped around the sheet feed roller 365, and conveyed along the surface of the platen 368 in the secondary scan direction Y. The carriage 362 is pulled by the pulling belt 366 driven by the scan motor 363 and moved along the guide rails 367 in the primary scan direction X. The print head 361 mounted on the carriage 362 also moves in the primary scan direction X.

The primary scan direction X is the direction perpendicular to the secondary scan direction Y.

The configuration described above causes the printing mechanism 360 to alternately repeat liquid discharge operation of causing the print head 361 to discharge the inks via the nozzles 36C while moving the print head 361 in the primary scan direction X and conveyance operation of conveying the print medium M in the secondary scan direction Y. As a result, the printing mechanism 360 prints letters, figures, and other images on the print medium M.

Figure 5:
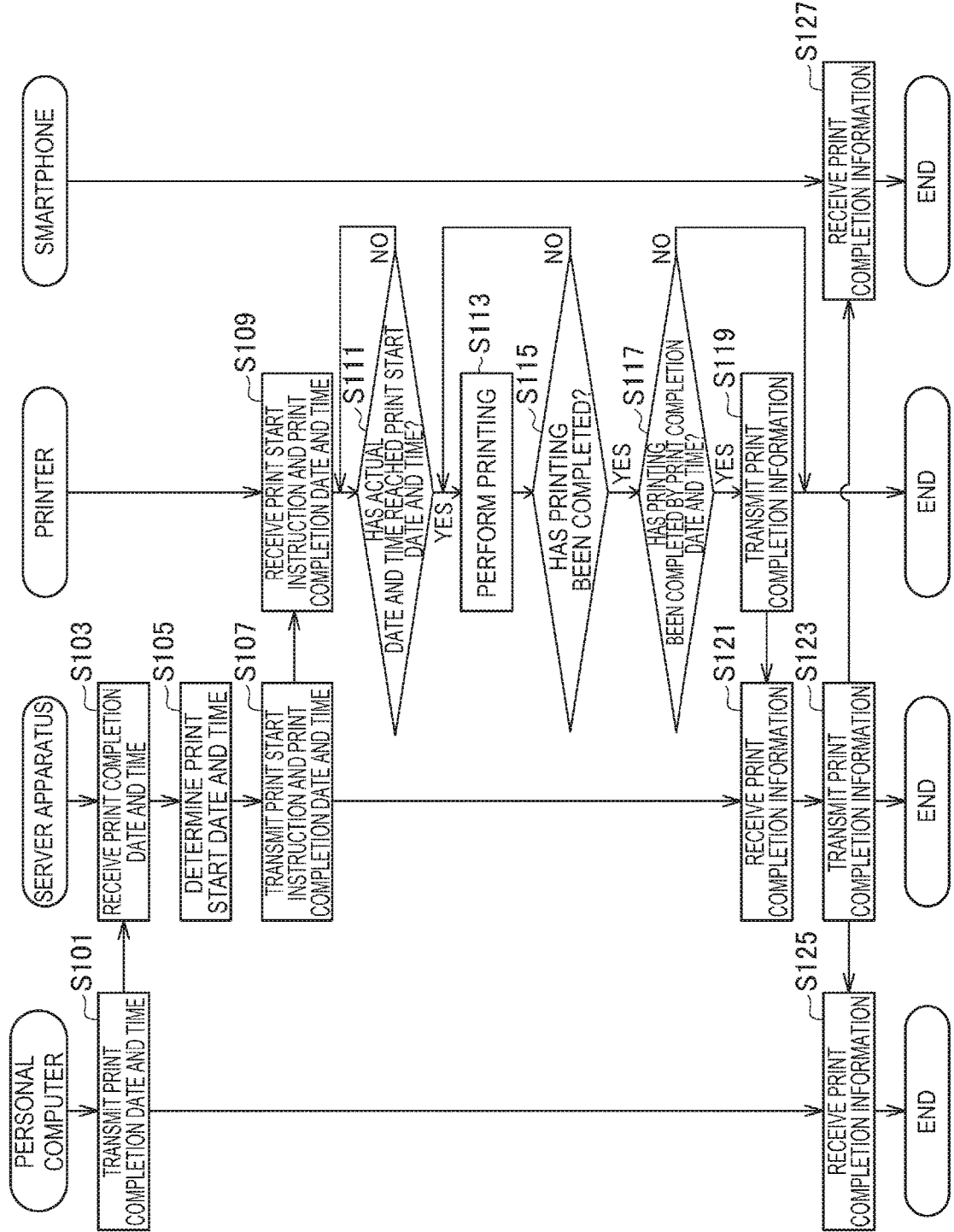
FIG. 5 is a flowchart showing an example of the action of the printing system.

The action of the printing system 1 will next be described with reference to FIG. 5. FIG. 5 is a flowchart showing an example of the action of the printing system 1. For convenience, FIG. 5 shows the first printer 300A as an example of the printer 300 and the first smartphone 400A as an example of the smartphone 400. In other words, FIG. 5 does not show the second printer 300B or the second smartphone 400B.

In step S101, the personal computer 100 transmits the first print completion date and time TE1 to the server apparatus 200, as shown in FIG. 5. The first print completion date and time TE1 is the date and time when the first printer 300A completes the printing of the teaching material content CT.

Thereafter, in step S103, the acceptance section 211 of the server apparatus 200 accepts the first print completion date and time TE1 from the personal computer 100.

Thereafter, in step S105, the determination section 212 of the server apparatus 200 determines the first print start date and time TS1 based on the first print completion date and time TE1 and the first print turnaround period PT1. The first print start date and time TS1 is the date and time when the first printer 300A starts printing the teaching material content CT. The first print turnaround period PT1 is the period required for the first printer 300A to print the teaching material content CT.

Thereafter, in step S107, the print instruction section 213 of the server apparatus 200 transmits to the first printer 300A the first print start instruction CM1, which instructs the first printer 300A to start printing the teaching material content CT at the first print start date and time TS1. The print instruction section 213 of the server apparatus 200 also transmits the first print completion date and time TE1 to the first printer 300A.

Thereafter, in step S109, the instruction acceptance section 311 of the first printer 300A accepts the first print start instruction CM1 and the first print completion date and time TE1 from the server apparatus 200.

Thereafter, in step S111, the print execution section 312 of the first printer 300A evaluates whether the date and time measured by the timekeeping function has reached the first print start date and time TS1.

When the print execution section 312 determines that the date and time measured by the timekeeping function has not reached the first print start date and time TS1 (NO in step S111), the process currently carried out enters a standby state. When the print execution section 312 determines that the date and time measured by the timekeeping function has reached the first print start date and time TS1 (YES in step S111), the print execution section 312 proceeds to the process in step S113.

Thereafter, in step S113, the print execution section 312 of the first printer 300A performs the printing of the teaching material content CT via the printing mechanism 360.

Thereafter, in step S115, the third notification section 313 of the first printer 300A evaluates whether the first printer 300A has completed the printing of the teaching material content CT.

When the third notification section 313 determines that the first printer 300A has not completed the printing of the teaching material content CT (NO: step S115), the process currently carried out enters the standby state. When the third notification section 313 determines that the first printer 300A has completed the printing of the teaching material content CT (YES: step S115), the third notification section 313 proceeds to the process in step S117.

Thereafter, in step S117, the third notification section 313 of the first printer 300A evaluates whether the printing of the teaching material content CT has been completed by the first print completion date and time TE1. In other words, the third notification section 313 of the first printer 300A evaluates whether the date and time determined in step S115 that the first printer 300A has completed the printing of the teaching material content CT is before the first print completion date and time TE1.

When the third notification section 313 determines that the printing of the teaching material content CT has not been completed by the first print completion date and time TE1 (NO: step S117), the third notification section 313 terminates the entire processes. When the third notification section 313 determines that the printing of the teaching material content CT has been completed by the first print completion date and time TE1 (YES: step S117), the third notification section 313 proceeds to the process in step S119.

Thereafter, in step S119, the third notification section 313 of the first printer 300A transmits the first print completion information JEA1 to the server apparatus 200. The first print completion information JEA1 indicates that the first printer 300A has completed the printing of the teaching material content CT by the first print completion date and time TE1.

Thereafter, in step S121, the second notification section 214 of the server apparatus 200 receives the first print completion information JEA1 from the first printer 300A.

Thereafter, in step S123, the second notification section 214 of the server apparatus 200 transmits the first print completion information JEA2 to the personal computer 100 and the first smartphone 400A.

Thereafter, in step S125, the personal computer 100 receives the first print completion information JEA2. The personal computer 100 then displays on the LCD of the personal computer 100 an image indicating that the first printer 300A has completed the printing of the teaching material content CT by the first print completion date and time TE1.

Thereafter, in step S127, the first smartphone 400A receives the first print completion information JEA2. The first smartphone 400A then displays on the LCD thereof an image indicating that the first printer 300A has completed the printing of the teaching material content CT by the first print completion date and time TE1. The entire processes are then terminated.

Step S103 corresponds to an example of an "acceptance step". Step S105 corresponds to an example of a "determination step". Step S107 corresponds to an example of a "print instruction step". Step S113 corresponds to an example of a "print execution step".

As described with reference to FIGS. 1 to 5, the printing system 1 according to the present embodiment includes the personal computer 100, the printer 300, and the server apparatus 200 communicably connected to each of the personal computer 100 and the printer 300. The server apparatus 200 includes the acceptance section 211, which accepts the print completion date and time TE, which is the date and time when the printing of the teaching material content CT is completed, from the personal computer 100, the determination section 212, which determines the print start date and time TS, which is the date and time to start printing the teaching material content CT, based on the print completion date and time TE and the print turnaround period PT, which is the period required to print the teaching material content CT, and the print instruction section 213, which transmits the print start instruction CM, which instructs the printer 300 to start printing the teaching material content CT at the print start date and time TS, to the printer 300. The printer 300 includes the print execution section 312, which starts printing the teaching material content CT at the print start date and time TS when the printer 300 receives the print start instruction CM from the server apparatus 200.

According to the configuration described above, the server apparatus 200 accepts the print completion date and time TE, which is the date and time when the printing of the teaching material content CT is completed, from the personal computer 100. The server apparatus 200 then determines the print start date and time TS, which is the date and time to start printing the teaching material content CT, based on the print completion date and time TE and the print turnaround period PT, which is the period required to print the teaching material content CT. The server apparatus 200 transmits to the printer 300 the print start instruction CM, which instructs the printer 300 to start printing the teaching material content CT at the print start date and time TS. The printer 300 starts printing the teaching material content CT at the print start date and time TS when the printer 300 receives the print start instruction CM from the server apparatus 200.

Therefore, since server apparatus 200 determines the print start date and time TS, which is the date and time to start printing the teaching material content CT, based on the print completion date and time TE and the print turnaround period PT, which is the period required to print the teaching material content CT, the print start date and time TS can be properly determined. When the printer 300 receives the print start instruction CM, which instructs the printer 300 to start printing the teaching material content CT at the print start date and time TS, the printer 300 starts printing the teaching material content CT at the print start date and time TS, so that the printing of the teaching material content CT can start at the proper date and time. The printer 300 can therefore print the teaching material content CT at the date and time desired by the third user UC, who is the user of the personal computer 100.

In the printing system 1 according to the present embodiment, the determination section 212 calculates the print turnaround period PT based on the number of printed sheets NC in the printing of the teaching material content CT and the print speed SP of the printer 300.

According to the configuration described above, the print turnaround period PT is calculated based on the number of printed sheets NC in the printing of the teaching material content CT and the print speed SP of the printer 300, so that the print turnaround period PT can be properly calculated.

The printing system 1 according to the present embodiment include the smartphone 400, which is communicably connected to the server apparatus 200 and operated by a user who uses printed matter showing the teaching material content CT. The personal computer 100 is operated by the third user UC, who instructs the printing of the teaching material content CT. The print instruction section 213 transmits the print completion date and time TE to the printer 300. The printer 300 includes the third notification section 313, which transmits to the server apparatus 200, when the printer 300 completes the printing of the teaching material content CT by the print completion date and time TE, the print completion information JE1 indicating that the printing of the teaching material content CT has been completed by the print completion date and time TE. The server apparatus 200 includes the second notification section 214, which transmits the print completion information JE2 to at least one of the personal computer 100 and the smartphone 400 when the server apparatus 200 receives the print completion information JE1 from the printer 300.

According to the configuration described above, the printer 300 transmits to the server apparatus 200, when the printer 300 completes the printing of the teaching material content CT by the print completion date and time TE, the print completion information JE1 indicating that the printing of the teaching material content CT has been completed by the print completion date and time TE. The server apparatus 200 transmits the print completion information JE2 to the personal computer 100 and the smartphone 400 when the server apparatus 200 receives the print completion information JE1 from the printer 300.

The third user UC, who is the user of the personal computer 100, and the user of the smartphone 400 can readily check that the printing of the teaching material content CT has been completed by the print completion date and time TE. The convenience of the user can therefore be improved.

In the printing system 1 according to the present embodiment, the printer 300 includes the print operation holding section 314, which puts the execution of the printing of another content different from the teaching material content CT on hold when the printer 300 accepts the instruction of printing the other content during the period from the print start date and time TS to the print completion date and time TE.

According to the configuration described above, when the printer 300 accepts the instruction of printing another content different from the teaching material content CT during the period from the print start date and time TS to the print completion date and time TE, the printer 300 puts the execution of the printing of the other content on hold. The teaching material content CT can therefore be reliably printed without being affected by the other print jobs JB.

In the printing system 1 according to the present embodiment, the printer 300 includes the print operation holding section 314, which puts the printing of another content different from the teaching material content CT on hold when the printer 300 accepts the instruction of printing the other content during the period from the print start date and time TS to the completion of the printing of the teaching material content CT.

According to the configuration described above, when the printer 300 accepts the instruction of printing another content different from the teaching material content CT during the period from the print start date and time TS to the completion of the printing of the teaching material content CT, the printer 300 puts the printing of the other content on hold. The teaching material content CT can therefore be reliably printed without being affected by the other print jobs JB.

In the printing system 1 according to the present embodiment, the printer 300 includes the first printer 300A and the second printer 300B. The determination section 212 determines the first print start date and time TS1 corresponding to the first printer 300A and the second print start date and time TS2 corresponding to the second printer 300B. The print instruction section 213 transmits the first print start instruction CM1, which instructs start of the printing of the teaching material content CT at the first print start date and time TS1, to the first printer 300A, and the second print start instruction CM2, which instructs start of the printing of the teaching material content CT at the second print start date and time TS2, to the second printer 300B.

According to the configuration described above, the first print start date and time TS1 corresponding to the first printer 300A and the second print start date and time TS2 corresponding to the second printer 300B are determined. The first print start instruction CM1, which instructs the first printer 300A to start printing the teaching material content CT at the first print start date and time TS1, is then transmitted to the first printer 300A. The print start instruction CM2, which instructs the second printer 300B to start printing the teaching material content CT at the second print start date and time TS2, is further transmitted to the second printer 300B.

The first print start date and time TS1 corresponding to the first printer 300A is determined, and the first print start instruction CM1, which instructs the first printer 300A to start printing the teaching material content CT at the first print start date and time TS1, is transmitted to the first printer 300A. The first printer 300A can therefore start printing the teaching material content CT at the proper timing. Furthermore, the second print start date and time TS2 corresponding to the second printer 300B is determined, and the second print start instruction CM2, which instructs the second printer 300B to start printing the teaching material content CT at the second print start date and time TS2, is transmitted to the second printer 300B. The second printer 300B can therefore start printing the teaching material content CT at the proper timing.

The method for controlling the printing system 1 according to the present embodiment is a method for controlling the printing system 1 including the personal computer 100, the printer 300, and the server apparatus 200 communicably connected to each of the personal computer 100 and the printer 300, and the server apparatus 200 executes an acceptance step of accepting the print completion date and time TE, which is the date and time when the printing of the teaching material content CT is completed, from the personal computer 100, a determination step of determining the print start date and time TS, which is the date and time to start printing the teaching material content CT, based on the print completion date and time TE and the print turnaround period PT, which is the period required to print the teaching material content CT, and a print instruction step of transmitting the print start instruction CM, which instructs start of the printing of the teaching material content CT at the print start date and time TS, to the printer 300, and the printer 300 executes a print execution step of starting printing the teaching material content CT at the print start date and time TS when the printer 300 receives the print start instruction CM from the server apparatus 200.

The configuration described above provides the same effects as those provided by the printing system 1 according to the present embodiment.

The server apparatus 200 according to the present embodiment is communicably connected to each of the personal computer 100 and the printer 300, and includes the acceptance section 211, which accepts the print completion date and time TE, which is the date and time when the printing of the teaching material content CT is completed, from the personal computer 100, the determination section 212, which determines the print start date and time TS, which is the date and time to start printing the teaching material content CT, based on the print completion date and time TE and the print turnaround period PT, which is the period required to print the teaching material content CT, and the print instruction section 213, which transmits the print start instruction CM, which instructs start of the printing of the teaching material content CT at the print start date and time TS, to the printer 300.

The configuration described above provides the same effects as those provided by the printing system 1 according to the present embodiment.

The present embodiment is an aspect of the present disclosure and can be changed and applied in any manner without departing from the intent of the present disclosure.

The present embodiment describes the case where the "information processing apparatus" is formed of the server apparatus 200, but not necessarily. The "information processing apparatus" may, for example, be formed of a personal computer or a table terminal.

The present embodiment has been described with reference to the case where the "printing apparatus" is the inkjet printer 300, but not necessarily. The "printing apparatus" only needs to be an apparatus that prints letters, images, and other objects on the print medium M such as a print sheet. For example, the "printing apparatus" may be what is called an electrophotographic printer.

The present embodiment has been described with reference to the case where the printer 300 includes two printers, that is, the first printer 300A and the second printer 300B, but not necessarily. The printer 300 may include three or more printers.

The present embodiment has been described with reference to the case where the "first terminal apparatus" is formed of the personal computer 100, but not necessarily. The "first terminal apparatus" may, for example, be formed of a table terminal or a smartphone.

The present embodiment has been described with reference to the case where the "second terminal apparatus" is formed of the smartphone 400, but not necessarily. The "second terminal apparatus" may, for example, be formed of a personal computer or a table terminal.

The present embodiment has been described with reference to the case where the smartphone 400 includes two smartphones, that is, the first smartphone 400A and the second smartphone 400B, but not necessarily. The smartphone 400 may include three or more smartphones.

In the present embodiment, the second notification section 214 of the server apparatus 200 transmits the print completion information JE2 to the personal computer 100 and the smartphone 400 when the second notification section 214 receives the print completion information JE1 from the printer 300, but not necessarily. The second notification section 214 may transmit the print completion information JE2 to at least one of the personal computer 100 and the smartphone 400 when the second notification section 214 receives the print completion information JE1 from the printer 300.

When the print operation holding section 314 accepts the instruction of printing another content different from the teaching material content CT during the period from the first print start date and time TS1 to the first print completion date and time TE1, the print operation holding section 314 puts the execution of the printing of the other content, but not necessarily. For example, when the print operation holding section 314 accepts the instruction of printing another content different from the teaching material content CT during the period from the first print start date and time TS1 to the completion of the printing of the teaching material content CT, the print operation holding section 314 may put the printing of the other content on hold.

The present embodiment has been described with reference to the control method achieved by the second control program PG2 executed by the second processor 210A provided in the server apparatus 200. Instead, to achieve the control method, the second control program PG2 executed by the second processor 210A can be formed of a computer-readable recording medium, or a transmission medium via which the second control program PG2 is transmitted. The recording medium described above can be a magnetic or optical recording medium or a semiconductor memory device. Examples of the recording medium may include a flexible disk, an HDD, a CD-ROM (compact disk read only memory), a DVD (digital versatile disk), a Blu-ray (registered trademark) disc, a magneto-optical disk, a flash memory, and a portable or immobile recording medium such as a card-shaped recording medium.

The recording medium described above may instead be a RAM, a ROM, an HDD, or any other nonvolatile storage apparatus that is an internal storage apparatus provided in the server apparatus 200.

The functions of the second control section 210 of the server apparatus 200 may be achieved by one or more processors or semiconductor chips. The second control section 210 may further include a co-processor, such as an SoC (System-on-a-Chip), an MCU (Micro Control Unit), and an FPGA. The second control section 210 may cause both the CPU and the co-processor to cooperate with each other, or selectively use one of the two to perform a variety of types of control.

The present embodiment has been described with reference to the control method achieved by the third control program PG3 executed by the third processor 310A provided in the printer 300. Instead, to achieve the control method, the third control program PG3 executed by the third processor 310A can be formed of a computer-readable recording medium, or a transmission medium via which the third control program PG3 is transmitted.

The recording medium described above can be a magnetic or optical recording medium or a semiconductor memory device. Examples of the recording medium may include a flexible disk, an HDD, a CD-ROM, a DVD, a Blu-ray (registered trademark) Disc, a magneto-optical disk, a flash memory, and a portable or immobile recording medium, such as a card-shaped recording medium.

The recording medium described above may instead be a RAM, a ROM, an HDD, or any other nonvolatile storage apparatus that is an internal storage apparatus provided in the printer 300.

The functions of the third control section 310 of the printer 300 may be achieved by one or more processors or semiconductor chips. The third control section 310 may further include an SoC, an MCU, an FPGA, or any other co-processor. The third control section 310 may cause both the CPU and the co-processor to cooperate with each other, or selectively use one of the two to perform a variety of types of control.

The process units in the flowchart shown in FIG. 5 are process units into which the process carried out by each of the second control section 210 of the server apparatus 200 and the third control section 310 of the printer 300 is divided in accordance with the primary processing content for easy understanding of the process. How to produce the divided process units or the names of the process units do not limit the present disclosure The process units of the flowchart may each be divided into a larger number of process units in accordance with the content of the process The process units may each be further divided into a large number of processes The sequence of the processes may be changed as appropriate to the extent that the changed order does not contradicts the intent of the present disclosure.

The functional portions shown in FIGS. 2 and 3 each represent a functional configuration and is not necessarily implemented in a specific form Hardware corresponding to each of the functional portions is not necessarily implemented, and a single processor that executes a program can achieve the functions of the plurality of functional portions Part of the functions achieved by software in the embodiment described above may be achieved by hardware, or part of the functions achieved by hardware in the embodiment described above may be achieved by software In addition, the specific detailed configuration of each of the other portions of the server apparatus 200 and the printer 300 can be changed in any manner to the extent that the change does not depart from the intent of the present disclosure.

What is claimed is:

1. A printing system comprising:
a first terminal apparatus of a first user;
a printing apparatus, which is positioned in a room of a second user; and
an information processing apparatus communicably connected to each of the first terminal apparatus and the printing apparatus,
wherein the information processing apparatus includes a first processor configured to perform functions of:
an acceptance section that accepts from the first terminal apparatus a print completion date and time that is a date and time when printing of a content is to be completed by the printing apparatus,
a determination section that determines a print start date and time that is a date and time to start printing the content based on the print completion date and time, a print turnaround period that is a period required to print the content by the printing apparatus, and a margin period required for the printing apparatus to complete printing of the content by the print completion date and time, and
a print instruction section that transmits a print start instruction that instructs start of the printing of the content at the print start date and time to the printing apparatus, and
the printing apparatus includes a second processor configured to perform functions of a print execution section that starts printing the content at the print start date and time when the printing apparatus receives the print start instruction from the information processing apparatus.

2. The printing system according to claim 1,
wherein the determination section calculates the print turnaround period based on a number of printed sheets in the printing of the content and a print speed of the printing apparatus.

3. The printing system according to claim 2,
further comprising a second terminal apparatus communicably connected to the information processing apparatus and operated by a user who uses printed matter showing the content,
wherein the first terminal apparatus is operated by a user who instructs the printing of the content,
the print instruction section transmits the print completion date and time to the printing apparatus,
the second processor of the printing apparatus is further configured to perform functions of a first completion notification section that transmits to the information processing apparatus, when the printing apparatus completes the printing of the content by the print completion date and time, print completion information indicating that the printing of the content is completed by the print completion date and time, and
the first processor of the information processing apparatus is further configured to perform functions of a second completion notification section that transmits the print completion information to at least one of the first terminal apparatus and the second terminal apparatus when the information processing apparatus receives the print completion information from the printing apparatus.

4. The printing system according to claim 1,
Wherein the second processor of the printing apparatus is further configured to perform functions of a print operation holding section that puts execution of printing of another content different from the content on hold when the printing apparatus accepts an instruction of printing the other content during a period from the print start date and time to the print completion date and time.

5. The printing system according to claim 1,
wherein the second processor of the printing apparatus is further configured to perform functions of a print operation holding section that puts printing of another content different from the content on hold when the printing apparatus accepts an instruction of printing the other content during a period from the print start date and time to completion of the printing of the content.

6. The printing system according to claim 1,
wherein the printing apparatus includes a plurality of printing apparatuses,
the determination section determines a print start date and time corresponding to each of the plurality of printing apparatuses, and
the print instruction section transmits to each of the plurality of printing apparatuses a print start instruction that instructs start of printing the content at a print start date and time corresponding each of the plurality of printing apparatuses.

7. A method for controlling a printing system including a first terminal apparatus of a first user, a printing apparatus, which is positioned in a room of a second user, and an information processing apparatus communicably connected to each of the first terminal apparatus and the printing apparatus,
wherein the information processing apparatus executes
accepting from the first terminal apparatus a print completion date and time that is a date and time when printing of a content is to be completed by the printing apparatus,
determining a print start date and time that is a date and time to start printing the content based on the print completion date and time, a print turnaround period that is a period required to print the content by the printing apparatus, and a margin period required for the printing apparatus to complete printing of the content by the print completion date and time, and transmitting a print start instruction that instructs start of the printing of the content at the print start date and time to the printing apparatus, and the printing apparatus executes starting the printing of the content at the print start date and time when the printing apparatus receives the print start instruction from the information processing apparatus.

8. An information processing apparatus communicably connected to each of a first terminal apparatus of a first user and a printing apparatus, which is positioned in a room of a second user the information processing apparatus comprising:

a processor configured to perform functions of:
an acceptance section that accepts a print completion date and time that is a date and time when printing of a content is completed from the first terminal apparatus;
a determination section that determines a print start date and time that is a date and time to start printing the content based on the print completion date and time, a print turnaround period that is a period required to print the content by the printing apparatus, and a margin period required for the printing apparatus to complete printing of the content by the print completion date and time, and
a print instruction section that transmits a print start instruction that instructs start of the printing of the content at the print start date and time to the printing apparatus.

\* \* \* \* \*